United States Patent [19]

Yamamoto

[11] 3,912,195

[45] Oct. 14, 1975

[54] TAPE TRANSPORT DEVICE FOR TAPE RECORDING AND/OR REPRODUCING APPARATUS

[75] Inventor: Hideharu Yamamoto, Yokohama, Japan

[73] Assignee: Sony Corporation, Tokyo, Japan

[22] Filed: Jan. 16, 1974

[21] Appl. No.: 433,788

[30] Foreign Application Priority Data

Jan. 19, 1973 Japan .................................. 48-8814
Jan. 19, 1973 Japan .................................. 48-8816

[52] U.S. Cl. ................................................ 242/201
[51] Int. Cl.$^2$ ...................... G03B 1/04; G11B 15/32
[58] Field of Search ........................... 242/201–204, 242/75, 53; 192/58, 82 T

[56] References Cited

UNITED STATES PATENTS

| | | | |
|---|---|---|---|
| 2,858,996 | 11/1958 | Switzer | 242/202 |
| 3,120,299 | 2/1964 | Wallenberg et al. | 242/75.53 X |
| 3,135,370 | 6/1964 | Sutton | 192/58 |
| 3,155,209 | 11/1964 | Weir | 192/82 T |

*Primary Examiner*—Leonard D. Christian
*Attorney, Agent, or Firm*—Lewis H. Eslinger; Alvin Sinderbrand

[57] ABSTRACT

The tape transport device of a tape recording and/or reproducing apparatus having normal-forward, fast-forward and rewind operating modes in which a tape is transported between supply and take-up reels is provided with fluid couplings in the drives for such reels. Each of the fluid couplings includes a driven member adapted to be rotatably coupled to the respective reel, a rotatable driving member and a body of liquid contacted by the driving and driven members for transmitting a torque therebetween, and the distance between the driving and driven members is varied in response to temperature changes so as to compensate for the effect of such temperature changes on the viscosity of the liquid. The distance between the driving and driven members of the fluid coupling associated with the take-up reel is changed for the normal-forward and fast-forward operating modes, respectively. In the normal-forward operating mode, the driving member of the fluid coupling associated with the supply reel is rotated at a substantially constant rotational speed so that, as the tape is unwound from the supply reel at a constant linear speed, as by the usual capstan and pinch roller, the torque resisting turning of the supply reel varies substantially in inverse proportion to the progressive decrease of the tape wound on the supply reel for maintaining a substantially constant back tension in the tape between the capstan and supply reel.

10 Claims, 11 Drawing Figures

TAPE TRANSPORT DEVICE FOR TAPE RECORDING AND/OR REPRODUCING APPARATUS

BACKGROUND OF THE INVENTION

1. Field of the Invention

This invention relates generally to a tape transport device for a tape recording and/or reproducing apparatus, and more particularly is directed to an improved tape transport device by which a recording tape may be moved between a supply reel and a take-up reel at different speeds corresponding to the various operating modes of the apparatus, for example, normal-forward, fast-forward and fast-rewind operating modes.

2. Description of the Prior Art

In a conventional type of tape transport device for a tape recording and/or reproducing apparatus, a capstan cooperating with a pinch roller for driving the tape at a constant speed from the supply reel toward the take-up reel in the normal-forward operating mode extends from a flywheel which is rotated from an electric motor by way of an elastic belt and pulley transmission. Reel drive shafts adapted to have the supply and take-up reels respectively coupled therewith are provided with driving drums. The elastic belt driven from the electric motor also drives a relatively large diameter pulley which, by way of a friction clutch, drives a relatively small diameter wheel contacted with the driving drum on the take-up reel drive shaft in the normal-forward operating mode for rotating the take-up reel in the direction winding the tape thereon. In the fast-forward operating mode, a pair of wheels of equal diameter connected to each other through a friction clutch is axially shifted so that the lower wheel contacts the rim of the rotated flywheel and the upper wheel contacts the driving drum of the take-up reel driveshaft for effecting the high speed rotation of the latter in the direction to wind the tape on the take-up reel. In the fast-rewind operating mode, the pair of equal diameter wheels is axially shifted so that the lower wheel contacts the rim of the rotated flywheel and the upper wheel contacts an idler wheel which is shifted into contact with the driving drum on the supply reel drive shaft for effecting the high speed rotation of the latter in the direction to rewind the tape on the supply reel.

In the normal-forward operating mode of the conventional tape transport device described above, back tension is usually applied to the tape between the capstan and supply reel by means of a braking force frictionally applied to the supply reel drive shaft. Such frictional braking force is substantially constant irrespective of the amount of tape would on the supply reel. Thus, as the tape is progressively unwound from the supply reel in the normal-forward operating mode, that is, during a recording or reproducing operation, the progressive decrease in the diameter of the outer turn of the tape wound on the supply reel results in a corresponding progressive decrease in the back tension on the tape. Further, in the described conventional tape transport device, the friction clutches through which the take-up and supply reel drive shafts are driven do not slip smoothly or uniformly with the result that flutter occurs in the tape, and such flutter is particularly disadvantageous in the normal-forward operating mode by reason of its effect on the recording or reproducing operation. The friction clutches used in the conventional tape transport device are further disadvantageous in that no compensation is provided for changes in the driving characteristics of the take-up and supply reels arising from temperature changes.

SUMMARY OF THE INVENTION

Accordingly, it is an object of this invention to provide a tape transport device for a tape recording and/or reproducing apparatus, as aforesaid, and by which the tape is transported between the supply and take-up reels without the occurrence of flutter in the tape.

Another object is to provide a tape transport device, as aforesaid, in which fluid couplings are included in the drives for the take-up and supply reels for avoiding the occurrence of flutter in the tape being transported between the reels.

Still another object is to provide a tape transport device, as aforesaid, in which a substantially constant back tension is maintained in the tape in the normal-forward operating mode, that is, in which the tension in the tape does not decrease in response to the decreasing diameter of the outer turn of the tape being unwound from the supply reel.

A further object is to provide a tape transport device as aforesaid, in which the torque applied to the take-up reel for winding the tape thereon is changed in the normal-forward operating mode and the fast-forward operating mode, respectively, whereby to ensure smooth transport of the tape in the normal-forward operating mode and to prevent damage to the tape in the fast-forward operating mode particularly when the tape is fully unwound from the supply reel.

A still further object is to provide a tape transport device, as aforesaid, in which compensation is provided for changes in the torque applied to the take-up reel and/or to the supply reel as a result of temperature changes.

In accordance with an aspect of this invention, a tape transport device having at least normal- and fast-forward operating modes in which a tape is unwound from a supply reel and wound on a takeup reel comprises tape drive means, such as, a capstan extending from a flywheel connected with an electric motor, and cooperating with a pinch roller in the normal-forward operating mode for driving the tape at a constant speed from the supply reel toward the take-up reel, reel drive means for applying torque to the take-up reel in the direction for winding the tape thereon and including a fluid coupling having a driven member adapted to be rotatably coupled to the take-up reel, a rotatable driving member and a body of liquid contacted by the driven and driving members for transmitting the torque therebetween, a first intermediate transmission assembly operative by the motor in the normal-forward operating mode, for example, by engagement with the flywheel from which the capstan extends, for rotating the driving member of the fluid coupling at a first speed so as to wind the tape on the take-up reel as the tape is driven at the constant speed by the capstan, and a second intermediate transmission assembly operative by the motor in the fast-forward operating mode, for example, by engagement with the flywheel, for rotating the fluid coupling driving member at a second relatively high speed so as to rapidly wind the tape on the take-up reel.

In a preferred embodiment of the invention, the drive for the supply reel also includes a fluid coupling similar to the previously described fluid coupling associated with the take-up reel and having its driving member rotated from the motor at a substantially constant rotational speed in the normal-forward operating mode so that, as the tape is unwound from the supply reel at a constant linear speed, as by the capstan, the torque resisting turning of the supply reel with the respective fluid coupling driven member various substantially in inverse proportion to the progressive decrease of the diameter of the outer turn of the tape wound on the supply reel for maintaining a substantially constant back tension in the tape between the capstan and the supply reel.

In accordance with another feature of this invention, the driven and driving members of the fluid coupling associated with the take-up reel are movable relative to each other for varying the distance therebetween, and hence changing the transmitted torque, and a torque change means positions the driven and driving members relatively close to each other in the normal-forward operating mode and increases the distance between the driven and driving members of the fluid coupling associated with the take-up reel in the fast-forward operating mode.

In accordance with still another feature of this invention, the distance between the driven and driving members of at least one of the fluid couplings provided in the tape transport device is varied in response to temperature changes so as to compensate for changes in the viscosity of the fluid coupling liquid resulting from such temperature changes.

BRIEF DESCRIPTION OF THE INVENTION

DESCRIPTION OF THE PREFERRED EMBODIMENTS

Figure 1:
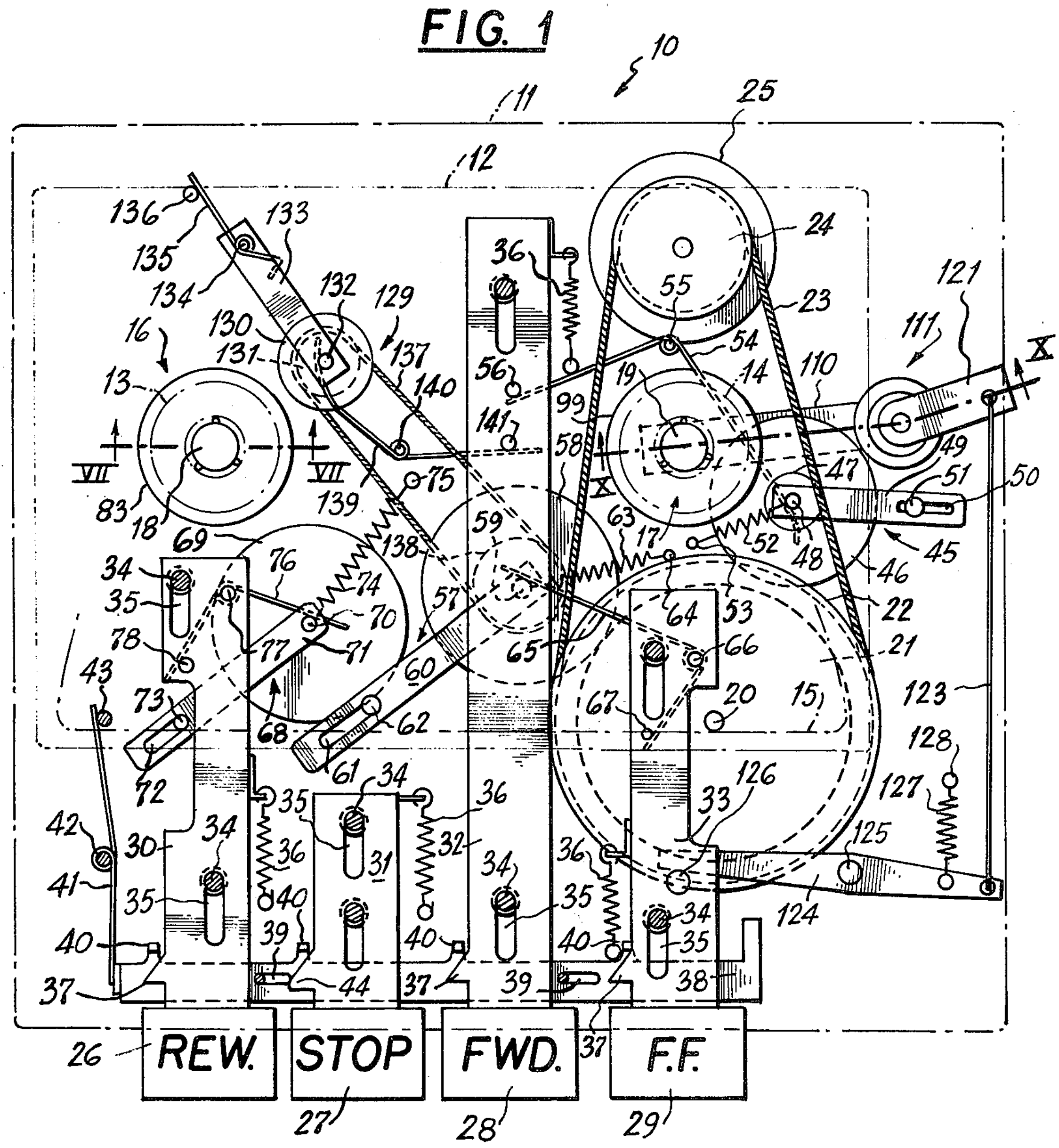
FIG. 1 is a top plan view of a tape transport device according to an embodiment of this invention, and which is shown in its stop or inoperative mode.

Referring to the drawings in detail, and initially to FIG. 1 thereof, it will be seen that, in a tape recording and/or reproducing apparatus having a tape transport device 10 according to this invention, there is provided a frame 11 shown in broken lines for supporting a tape cassette 12 which is also shown in broken lines. The cassette 12 contains the usual rotatable supply and take-up reels 13 and 14 and a magnetic recording take which is wound on reels 13 and 14 and suitably guided therebetween so that a run 15 of the tape extends along a side of the cassette. The tape transport device 10 is shown to include supply reel and take-up reel drive assemblies 16 and 17 which are rotatably supported by frame 11 and which respectively include heads 18 and 19 above the frame that extend into, and are rotatably coupled with the hubs of reels 13 and 14 when cassette 12 is positioned on frame 11. Also extending upwardly from frame 11 is a rotatable capstan 20 which, when cassette 12 is positioned on the frame, extends into a suitable opening in the cassette housing and is disposed adjacent the inner side of tape run 15, as shown. The tape recording and/or reproducing apparatus in which tape transport device 10 is incorporated also includes the usual carriage (not shown) slidably mounted on frame 11 and carrying one or more magnetic heads and a pinch roller. When such carriage is moved to its operative position in the normal-forward operating mode of the tape transport device, the heads and pinch roller thereon extend through suitable windows in a side wall of the cassette housing for engaging tape run 15, whereby the magnetic heads record or reproduce signals on the tape and the pinch roller presses the tape against capstan 20 which thereby drives the tape at a constant linear speed in the direction from supply reel 13 toward take-up reel 14. The capstan 20 is shown to extend upwardly from a flywheel 21 which is rotatably mounted below frame 11 and which has a large-diameter pulley 22 integral therewith. Pulley 22 is driven by an elastic belt 23 running about a pulley 24 on the shaft of an electric motor 25 mounted below the frame.

Operating mode selecting buttons 26,27,28 and 29 are provided for respectively selecting the fast-rewind operating mode, the stop mode, the normal-forward operating mode and the fast-forward operating mode of tape transport device 10. The push-buttons 26,27,28 and 29 respectively extend from slides 30, 31,32 and 33 which are slidably mounted on frame 11 for rectilinear movement relative to the frame, for example, by means of mounting pins 34 extending from frame 11 and being slidably received in elongated slots 35 provided in slides 30–33. Slides 30–33 are yieldably urged forwardly by means of respective springs 36 connected at one end to the slides and having their other ends connected to anchors on frame 11 so as to normally dispose the respective push-buttons 26–29 at inactive, projecting positions, as shown in FIG. 1. Each of slides 30–33 is adapted to be displaced against the force of the respective spring 36 to an operative position by manual depression or actuation of the respective one of push-buttons 26–29.

In order to selectively lock each of slides 30,32 and 33 in its operative position, each of those slides has a triangular projection 37 extending from one side thereof, and an elongated locking member 38 extends laterally across slides 30–33 and is mounted for lateral sliding movement relative to frame 11, for example, by the pin and slot connections indicated at 39. Abutments 40 project from locking member 38 adjacent slides 30–33, and a torsion spring 41 is mounted on a pin 41 carried by frame 11 and has one end bearing against an anchor 43 extending from the frame, while the other end of spring 41 bears against the adjacent end of locking member 38 for urging the latter toward the right, as viewed on FIG. 1, that is, in the direction urging abutments 40 against the adjacent sides of slides 30–33. When any one of slides 30,32 and 33 is displaced to its operative position by depression of its respective push-button, the sloping surface of the respective triangular projection 37 acts against the respective abutment 40 so as to urge locking member 38 toward the left against the force of spring 41 until the triangular projection 37 is disposed in back of abutment 40, whereupon spring 41 returns locking member 38 toward the right so as to engage the abutment 40 in front of the laterally extending surface of the respective projection 37 for retaining the displaced slide 30,32 or 33 in its operative position. Slide 31 associated with push-button 27 for selecting the stop mode of tape transport device 10 is shown to have a trapezoidal projection 44 dimensioned so that, when push-button 27 is fully depressed or actuated for displacing slide 31 to its operative position, the sloping surface of projection 44 acting against the respective abutment 40 moves locking member 38 toward the left, whereupon the outer edge surface of trapezoidal projection 44 which is parallel to the direction of movement of slide 31 will engage the respective abutment 40. Thus, upon the removal of the manually applied pressure from push-button 27, the latter and the associated slide 31 are returned to their inactive position by the respective spring 36. It will be apparent that, after any one of the slides 30,32 and 33 has been displaced to its operative position and locked in that operative position by the cooperation of the respective projection 37 and abutment 40, the displacement of slide 31 to its operative position will be effective to release locking member 38 from the previously displaced slide 30,32 or 33 and permit the return of the latter to its inactive position by the respective spring 36.

Figure 2:
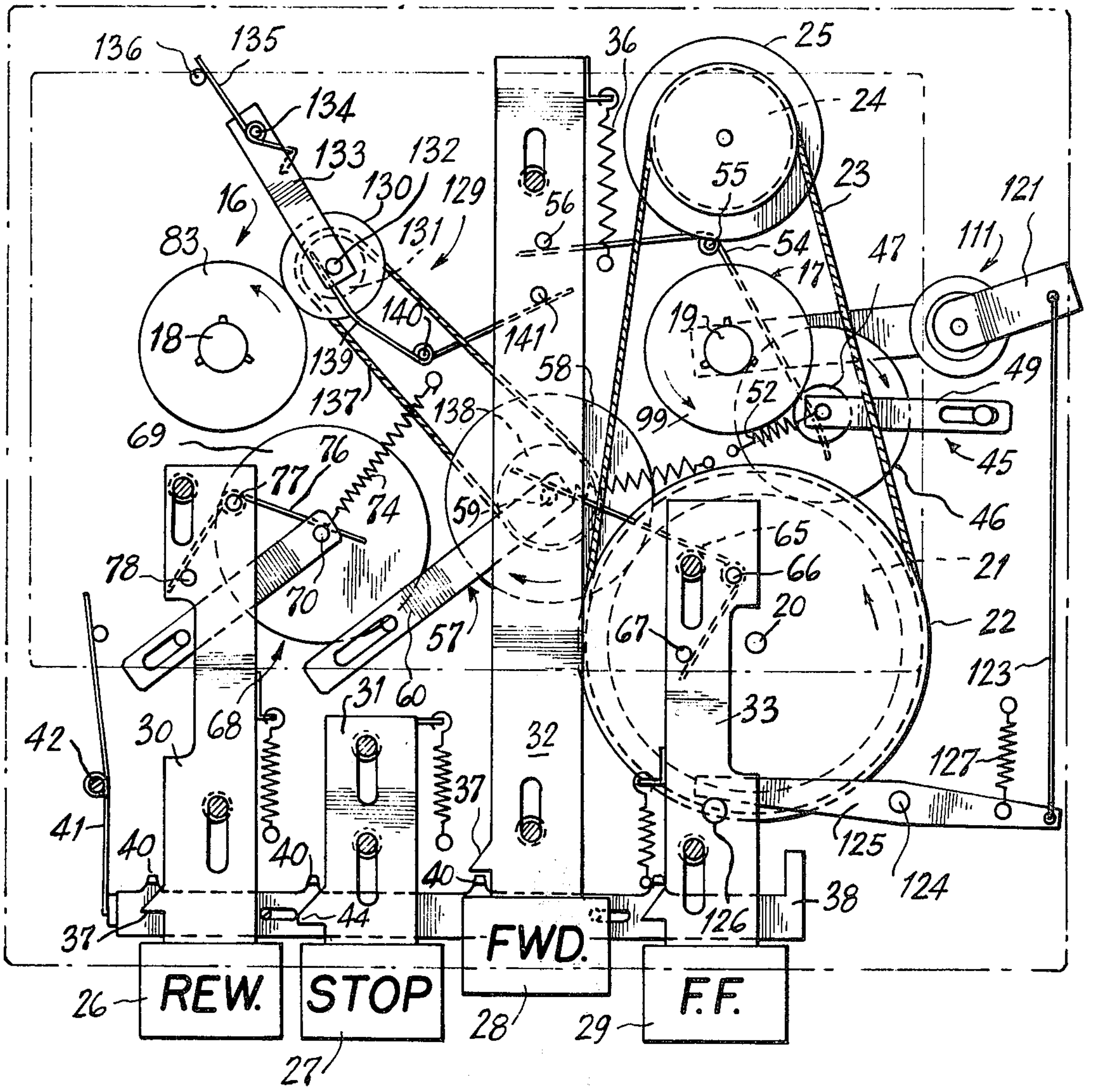
FIG. 2 is a view similar to that of FIG. 1, but showing the tape transport device in its normal-forward operating mode.

In order to rotate take-up reel 14 in the counterclockwise direction at a relatively slow rotational speed for winding the tape on reel 14 in the normal-forward operating mode, tape transport device 10 is shown to include a first intermediate transmission assembly 45. The intermediate transmission assembly 45 is shown to include a relatively large diameter wheel 46 and a relatively small diameter wheel 47 fixed on a common shaft 48 which is journalled in one end of a lever 49. The other end of lever 49 has an elongated slot 50 slidably receiving a mounting pin carried by frame 11 so that lever 49 is mounted for longitudinal sliding movement and pivoting relative to the frame. A spring 52 is connected between lever 49 and an anchor 53 on frame 11 for urging intermediate transmission assembly 45 to an operative position (FIG. 2) in which large diameter wheel 46 engages and is driven by the periphery of flywheel 21 and small diameter wheel 47 is engaged with take-up reel drive assembly 17 for transmitting rotational movement to the latter. An L-shaped spring lever 54 is pivoted, intermediate its ends, on a pin 55 carried by frame 11 and has one of its ends engaged against shaft 48 of transmission assembly 45 while the other end of spring lever 54 is engaged by a pin 56 carried by slide 32. In the inactive position of slide 32 (FIG. 1) pin 56 thereon urges spring lever 54 in the counterclockwise direction, as viewed on FIG. 1, so that the end portion of spring lever 54 engaged with shaft 48 moves transmission assembly 45 to its inoperative position (FIG. 1) in which its wheels 46 and 47 are spaced from flywheel 21 and drive assembly 17, respectively.

Figure 3:
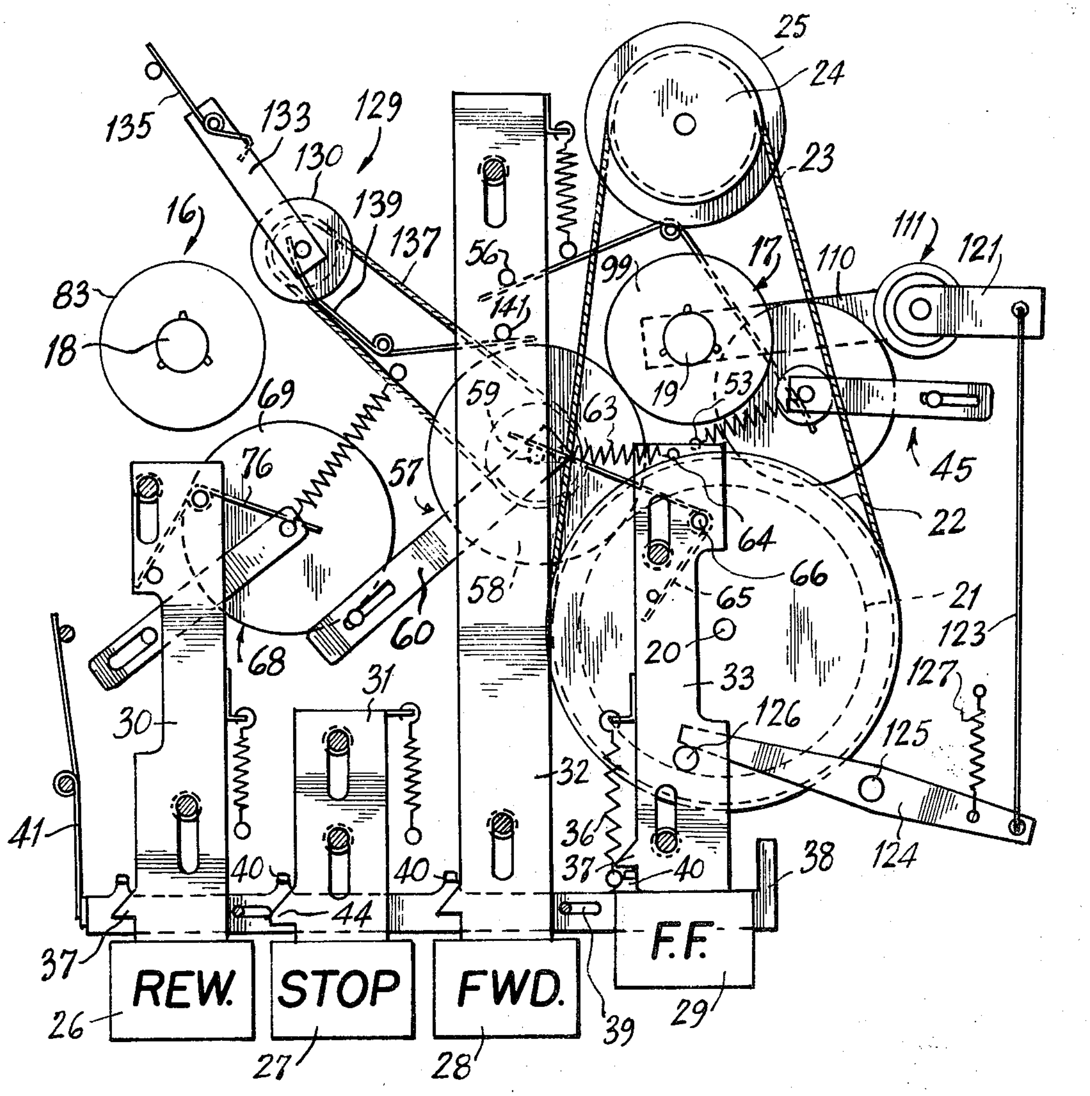
FIG. 3 is another view similar to that of FIG. 1, but showing the tape transport device in its fast-forward operating mode.

In order to effect the relatively high speed counterclockwise rotation of take-up reel 14 for winding the tape thereon in the fast-forward operating mode, tape transport device 10 is shown to also include a second intermediate transmission assembly 57 made up of a relatively large diameter wheel 58 on a shaft 59 journalled in one end of a lever 60 having an elongated slot 61 in its other end portion slidably receiving a mounting pin 62 carried by frame 11 so that lever 60 can pivot and move longitudinally relative to the frame. A spring 63 is connected between lever 60 and an anchor 64 on frame 11 for urging intermediate transmission assembly 57 to an operative position (FIG. 3) in which wheel 58 simultaneously engages the periphery or rim of flywheel 21 and take-up reel drive assembly 17 for transmitting rotational movement to the latter. An L-shaped spring lever 65 is pivotally mounted, intermediate its ends, on a pin 66 carried by slide 33 and has one of its ends engaged with shaft 59 while its other end is engaged by a pin 67 on slide 33.

When slide 33 is in its inactive position (FIG. 1), spring lever 65 thereon acts on shaft 59 in opposition to spring 63 for displaying intermediate transmission assembly 57 to its inoperative position in which wheel 58 is spaced from take-up reel drive assembly 17, but remains engaged with the periphery of flywheel 21.

In order to effect the relatively high speed clockwise rotation of supply reel 13 for rewinding the tape thereon in the fast-rewind operating mode, tape transport device 10 is shown to further include a third intermediate transmission assembly 68 having a relatively large diameter wheel 69 mounted on a shaft 70 which is journalled in one end of a lever 71 having an elongated slot 72 in its other end portion slidably receiving a mounting pin 73 carried by frame 11 so that lever 71 can pivot and move longitudinally relative to the frame. A spring 74 is connected between lever 71 and an anchor 75 on frame 11 for urging transmission assembly 68 to its operative position (FIG. 4) in which the periphery of wheel 69 is engaged with, and driven by the periphery of wheel 58 of transmission assembly 57, and further in which wheel 69 is engaged with supply reel drive assembly 16 for transmitting rotational movement to the latter. An L-shaped spring lever 76 is pivoted, intermediate its ends, with the shaft 70, while the other end of spring lever 76 is engaged by a pin 78 on slide 30. When slide 30 is in its inactive position (FIG. 1), spring lever 76 thereon acts against shaft 70 in opposition to spring 74 for displacing transmission assembly 68 to its inoperative position in which wheel 69 is spaced from wheel 58 and also spaced from supply reel drive assembly 16.

Figure 7:
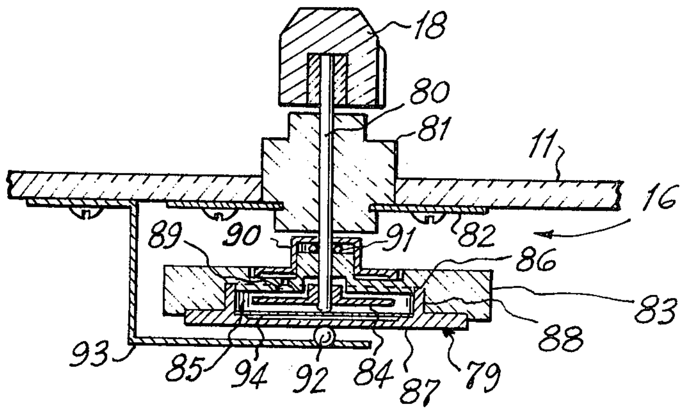
FIG. 7 is an enlarged sectional view taken along the line VII—VII on FIG. 1, and showing details of a supply reel drive assembly included in the tape transport device according to this invention.
Figure 9:
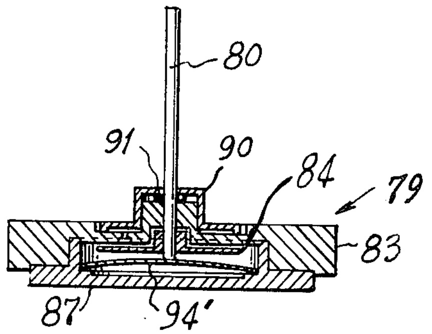
FIG. 9 is a detail sectional view corresponding to a portion of FIG. 7, but illustrating a change in the relative positioning of driving and driven members of the fluid coupling to compensate for a change in temperature.
Figure 8:
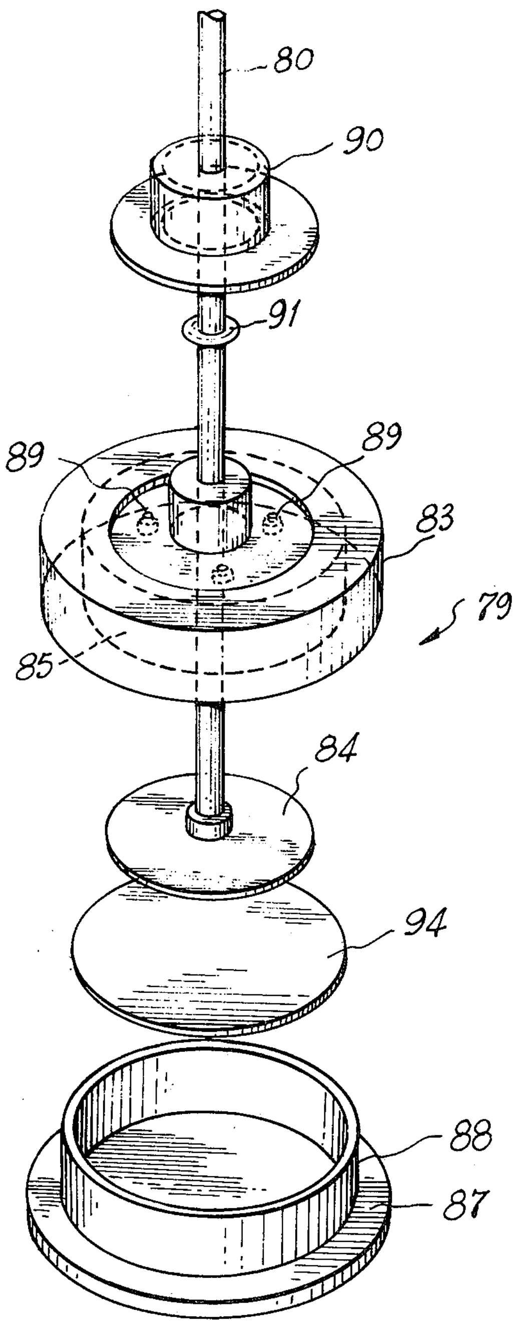
FIG. 8 is an exploded perspective view of various elements of a fluid coupling included in the supply reel drive assembly of FIG. 7.

Referring now to FIGS. 7,8 and 9, it will be seen that, in the tape transport device 10 according to this invention, supply reel drive assembly 16 includes a fluid coupling 79 through which a torque is applied to a respective reel drive shaft 80 having the head 18 secured on its upper end for rotatable coupling with supply reel 13. The shaft 80 is shown to be rotatably mounted in a bearing bushing 81 carried by a plate 82 which is secured, as by screws, to the underside of frame 11. The lower end portion of shaft 80 extends rotatably in a central bore in a driving member or drum 83 of fluid coupling 79, and a driven member 84 of the fluid coupling is secured on shaft 80 in a cavity 85 defined within drum 83. The cavity 85 opening at the bottom of drum 83 is cylindrical and an annular groove 86 is formed in the roof of cavity 85 at the side wall surface of the latter. The bottom of cavity 85 is closed by a circular closure wall 87 having an annular upstanding flange 88 which fits tightly against the slide wall surface of cavity 88 and has its upper edge engaged in groove 86. The roof of cavity 85 has a plurality of small vent bores 89 extending therethrough and being normally closed by a sealing cap 90 which also contains a sealing ring 91 extending around shaft 80 for preventing the leakage of liquid from cavity 85 about shaft 80. Drum 83 is axially positioned by a ball bearing 92 which supports closure 87 at the center of the latter and which is carried by a support arm 93 depending from frame 11.

In order to axially position shaft 80 and thereby determine the distance between the upper surface of driven member 84 and the underside of the roof of cavity 85 in drum or driving member 83, fluid coupling 79 has a circular bimetallic plate 94 located on closure 87 within flange 88 to support the lower end of shaft 80 at the center of bimetallic plate 94. Finally, a viscous liquid, such as oil, is contained in cavity 85, and hence in the gap or clearance between the upper surface of driven member 84 and the underside of the roof of cavity 85 in driving member 83, for transmitting torque between driving and driven members 83 and 84. In response to relatively low temperature, bimetallic plate 94 is relatively flat, as shown on FIG. 7, to provide a predetermined clearance or gap between the upper surface of driven member 84 and the underside of the roof of cavity 85, whereby to provide fluid coupling 79 with a predetermined torque-transmitting characteristic. However, in response to an increase in temperature which correspondingly lowers the viscosity of the liquid in cavity 85, bimetallic plate 84 becomes bowed or upwardly convex, as indicated at 94' on FIG. 9, so that shaft 80 and driven member 84 thereon are displaced upwardly relative to driving member 83 for narrowing the gap between the upper surface of driven member 84 and the underside of the roof of cavity 85 and thereby maintaining a substantially constant torque transmitting characteristic.

Figure 11:
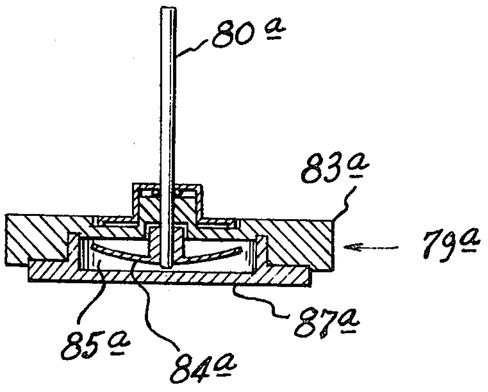
FIG. 11 is a sectional view similar to that of FIG. 9, but illustrating another arrangement of the fluid coupling for obtaining temperature compensation.

Referring now to FIG. 11, it will be seen that the fluid coupling 79*a* there illustrated is generally similar to the fluid coupling 79 and has its several parts identified by the same reference numerals used for identifying the corresponding parts on FIGS. 7,8 and 9, but with the letter *a* appended thereto. In the fluid coupling 79*a*, the bimetallic plate 94 of the previously described fluid coupling 79 is omitted, and the temperature compensation function thereof is obtained by forming the driven member 84*a* of a bimetallic material. Further, shaft 80*a* rests, at its lower end, directly on closure 87*a* so that shaft 80*a* and driving member 83*a* are in a fixed axial relation to each other. The bimetallic material of driven member 84*a* is arranged so that, at relatively lower temperature, driven member 84*a* is substantially planar to provide a predetermined gap between the upper surface of driven member 84*a* and the underside of the roof of cavity 85*a*, which gap provides fluid coupling 79*a* with a predetermined torque transmitting characteristic. However, in response to increases in temperature, the bimetallic material of driven member 84*a* flexes upwardly, as shown on FIG. 11, to narrow the gap between driven member 84*a* and the roof of cavity 85*a* and thereby compensate for the decreasing viscosity of the liquid in cavity 85*a*.

In assembly the fluid coupling 79 or 79*a*, the shaft 80 with driven member 84 secured on its lower end portion is initially extended upwardly through the central bore in the roof of cavity 85 so as to dispose driven member 84 within such cavity. Then, the saucer-like space defined within flange 88 on closure 87 is filled with oil or other viscous liquid, and the flange 88 is forced upwardly into cavity 85 against the side surface of the latter until the upper edge of flange 88 seats in groove 86. During such assembling together of closure 87 and drum or driving member 83, the air contained within cavity 85 and any excess liquid is forced out through small bores 89 in the roof of cavity 85. Thereafter, sealing cap 90 and sealing ring 91 are installed over shaft 80 projecting upwardly from driving member 83 so as to seal bores 89 and further to seal the central bore through which shaft 80 extends.

Figure 10:
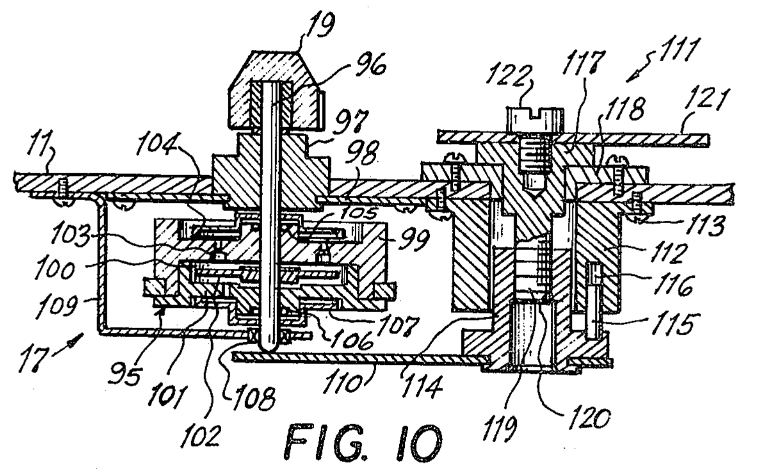
FIG. 10 is an enlarged sectional view taken along the line X—X on FIG. 1, and showing details of a take-up reel drive assembly and of a torque changing mechanism included in the tape transport device according to this invention.

Referring now to FIG. 10, it will be seen that, in accordance with this invention, the take-up reel drive assembly 17 of tape transport device 10 also includes a fluid coupling 95 through which torque for rotating take-up reel 14 is transmitted to a shaft 96 having the head 19 secured on its upper end for rotatable coupling with the take-up reel. Shaft 96 is shown to extend rotatably through a bearing bushing 97 which is carried by a plate 98 secured, as by screws, to the underside for frame 11, and the lower end portion of shaft 96 is associated with the fluid coupling 95 which is generally similar to the previously described fluid coupling 79. As shown, fluid coupling 95 includes a drum or driving member 99 having a downwardly opening cylindrical cavity 100 closed by a closure 101 and containing oil or other viscous liquid in which there is located a driven member 102 fixed on shaft 96. As before, the roof of cavity 100 has small bores 103 therein for exhausting air and excess liquid from cavity 100 during the assembly of fluid coupling 95 and such small bores as normally sealed by a sealing cap 104 which also contains a sealing ring 105 for providing a seal about the central bore in the roof of cavity 100 through which shaft 96 extends. In the case of fluid coupling 95, closure 100 also has a central bore through which the lower end portion of shaft 96 extends downwardly from coupling 95, and such central bore of closure 100 is sealed by a sealing ring 106 extending about shaft 96 within a sealing cap 107 secured to closure 101. The lower end of shaft 96 projecting from closure 101 is rotatable and axially slidable in a bearing 108 carried by an arm 109 depending from frame 11. The axial positioning of shaft 96, and hence the distance between the upper surface of driven member 102 and the underside of the roof of cavity 100, is determined by a vertically movable support arm 110 which extends under and provides an axial bearing support for the lower end of shaft 96.

In accordance with this invention, support arm 110 forms part of a torque change mechanism 111 by which the torque transmitting characteristics of fluid coupling 95 are changed for the normal-forward operating mode and the fast-forward operating mode, respectively of tape transport device 10. As shown on FIG. 10, torque change mechanism 111 may include a cylindrical housing 112 secured to the underside of frame 11, as by screws 113, and vertically guiding a plunger 114 which is slidable in and extends downwardly from housing 112 and which has support arm 110 extending horizontally therefrom. In order to prevent turning of plunger 114 and thereby retain support arm 110 under shaft 96, a pin 115 extends upwardly from a peripheral portion of plunger 114 and is slidably received in a bore 116 provided in housing 112 and spaced radially from the axis of the latter. An actuating member 117 is turnable in a bearing 118 secured in the upper portion of housing 112 and has a depending jack screw 119 which is threadably received in a tapped bore 120 extending axially in plunger 114. Thus, turning of actuating member 117 is effective to cause vertical displacement of plunger 114 and of the support arm 110 extending therefrom. A radial arm 121 is secured, as by a screw 122, on actuating member 117, and the outer end of arm 121 is connected by a link rod 123 (FIG. 1) to one end of a double-armed lever 124 which is pivoted on a pin 125 carried by frame 111. The other end portion of lever 124 is engageable by a pin 126 on slide 33 and a spring 127 is connected between lever 124 and an anchor 128 on frame 11 for urging lever 124 in the counter-clockwise direction against pin 126.

Whenever, slide 33 is in its inactive position, and more particularly when slide 32 is in its operative position to select the normal-forward operating mode of tape transport device 10 (FIG. 2), lever 124, link rod 123 and arm 121 are disposed so that screw 119 positions plunger 114 and support arm 110 at a relatively high position, with the result that shaft 96 and driven member 102 are shifted upwardly relative to driving member 99 to provide a relatively small gap or clearance between the upper surface of driven member 102 and the underside of the roof of cavity 100. Such relatively small gap provides the desired torque transmitting characteristics for fluid coupling 95 by which take-up reel 14 is rotated to wind the tape thereon in the normal-forward operating mode. However, when slide 33 is displaced to its operative position (FIG. 3) for selecting the fast-forward operating mode of tape transport device 10, pin 126 on slide 33 turns lever 124 in the clockwise direction and, through link rod 123 and arm 121, screw 119 is similarly turned to shift plunger 114 and support arm 110 in the downward direction. As a result of the foregoing, shaft 96 and driven member 102 thereon are moved downwardly relative to driving member 99 for increasing the gap or distance between the upper surface of driven member 102 and the underside of the roof of cavity 100. Such increased gap width changes the torque transmitting characteristics of fluid coupling 95 in the fast-forward operating mode, more particularly reduces the torque transmitted from driving member 99 to driven member 102 for avoiding damage to the tape, for example, when the tape is fully unwound from supply reel 13.

In order to provide the take-up reel drive assembly 17 with compensation for temperature changes, the driven member 102 of fluid coupling 95 may be formed of a bimetallic material, as described above with reference to FIG. 11 in connection with the fluid coupling **79*a* in the supply reel drive assembly. Alternatively, the support arm 110 of torque change mechanism 111 may be formed of a bimetallic material so that the end portion of arm 110 supporting shaft 96 will move upwardly in response to a temperature increase to narrow the gap between driven member 102 and the roof of cavity 100**, and thereby compensate for the decrease in viscosity resulting from the temperature increase.

It will be apparent that the drum of driving member 99 of fluid coupling 95 is diametrically dimensioned and axially located for engagement, at its periphery, by wheel 47 of intermediate transmission assembly 45 in the operative position of the latter, that is, in the normal-forward operating mode, and for engagement by the wheel 58 of intermediate transmission assembly 57 in the operative position of the latter, that is, in the fast-forward operating mode. Similarly, the drum of driving member 83 of fluid coupling 79 is diametrically dimensioned and axially located for engagement by the wheel 69 of intermediate transmission assembly 68 in the operative position of the latter, that is, in the fast-rewind operating mode.

Figure 5:
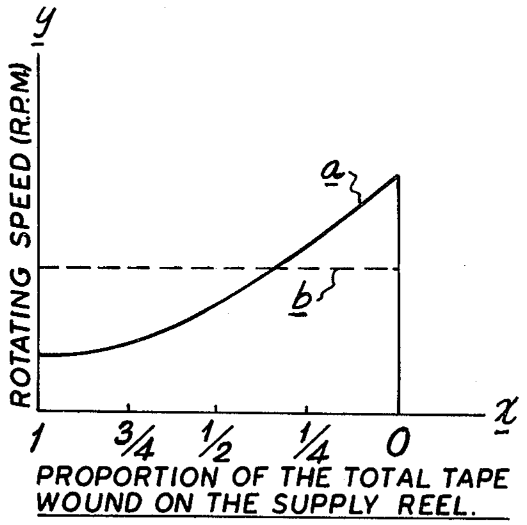
FIG. 5 is a graph showing the variation in the rotational speed of the supply reel as the tape is unwound therefrom in the normal-forward operating mode of the tape transport device.
Figure 6:
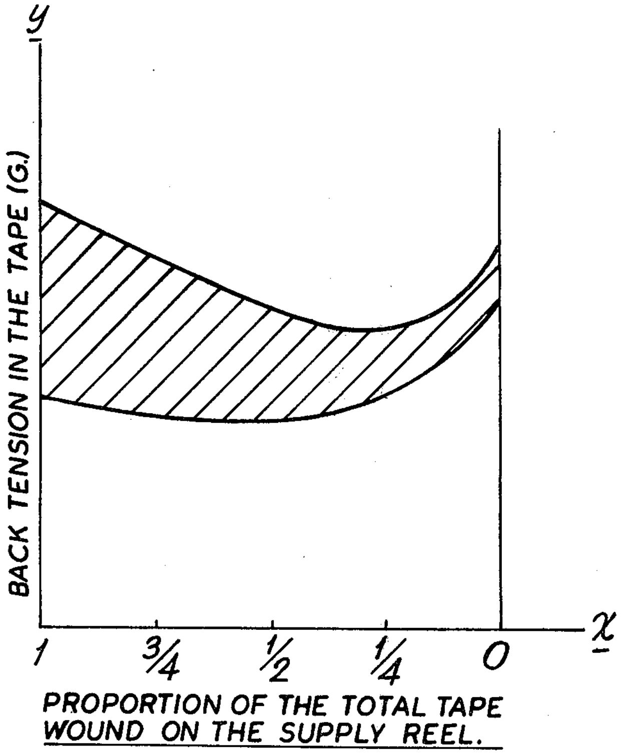
FIG. 6 is a graph illustrating the back tension applied to the tape as the latter is unwound from the supply reel in the normal-forward operating mode.

Further, in accordance with this invention, the tape transport device 10 is provided with an auxiliary transmission assembly 129 operative, in cooperation with fluid coupling 79 of supply reel drive assembly 16, in the normal-forward operating mode of tape transport device 10 to maintain a substantially constant back tension in tape run 15 between capstan 20 and supply reel 13. As shown, auxiliary transmission assembly 129 includes a wheel 130 formed integrally with a pulley 131 and mounted rotatably on a shaft 132 carried by one end of an arm 133 which is pivoted, at its other end, on a pin 134 carried by frame 11. A torsion spring 135 engages at one end against an anchor 136 on frame 11, and its other end acts against arm 133 for urging the latter in the direction for engaging wheel 130 against the periphery of drum or driving member 83 of fluid coupling 79. A belt 137 extends around pulley 131 and around a pulley 138 of similar diameter which is formed integrally with wheel 58 of intermediate transmission assembly 57. A spring lever 139 is pivoted intermediate its ends on a pivot pin 140 carried by frame 11 and is engageable, at one of its ends, against shaft 132, while a pin 141 on slide 132 acts against the other end of spring lever 139. So long as slide 32 is in its inactive position (FIG. 1), pin 141 turns spring lever 139 in the clockwise direction and thereby holds wheel 130 spaced from the periphery of drum or driving member 83. However, when slide 32 is moved to its operative position, that is, in the normal-forward operating mode of tape transport device 10 (FIG. 2), pin 141 on slide 32 moves away from the adjacent end of spring lever 139 so that wheel 130 can be moved into engagement with drum or driving member 83 by the action of spring 135 on arm 133. Since wheel 58 of intermediate transmission assembly 57 remains in engagement with flywheel 21 in the normal-forward operating mode, rotational movement is transmitted by way of pulley 138, belt 137, pulley 131 and wheel 130 for rotating driving member 83 in the counterclockwise direction, as viewed on FIG. 2, that is, in the direction for unwinding tape from supply reel 13. Of course, in the normal-forward operating mode, auxiliary transmission assembly 129 rotates driving member 83 of fluid coupling 79 at a constant rotational speed without regard to the proportion of the total tape wound on supply reel 13, for example, as indicated by the broken line *b* on FIG. 5. At the same time that driving member 83 is thus being rotated at a constant rotational speed, reel 13 coupled to shaft 80 through head 18, and hence driven member 84 of fluid coupling 79, is being rotated at a progressively increasing rotational speed, for example, as indicated by the solid line *a* on FIG. 5, in response to the driving of the tape by capstan 20 at a constant linear speed as the diameter of the outer turn of the tape on reel 13 progressively decreases with the unwinding of the tape therefrom. In the case where a friction brake (not shown) is conventionally applied to supply reel drive shaft 80 in the normal-forward operating mode of the tape transport device, pulleys 131 and 138 and wheel 130 of auxiliary transmission assembly 129 may be diametrically dimensioned so that, in the normal-forward operating mode, the constant rotational speed at which drum or driving member 83 of fluid coupling 79 is driven is intermediate the minimum and maximum rotational speeds at which supply reel 13 and driven member 84 of the fluid coupling are rotated during the unwinding of the tape from reel 13. Thus, for example, as shown on FIG. 5, the constant rotational speed *b* at which driving member 83 is rotated by transmission assembly 129 may be substantially equal to the speed at which the tape being driven at a constant linear speed rotates supply reel 13 and driven member 84 when approximately one-third of the total tape remains wound on supply reel 13. With the constant rotational speed of driving member 83 being selected as shown on FIG. 5, fluid coupling 79 initially applies a progressively decreasing driving force to shaft 80 in opposition to the frictional braking force until approximately only one-third of the total tape remains on supply reel 13 and, thereafter, fluid coupling 79 applies a progressively increasing torque which is added to the frictional braking force. Thus, as the tape is unwound from supply reel 13 in the normal-forward operating mode, the frictional braking force and the torque transmitted by fluid coupling 79 combine to provide a torque resisting turning of the supply red which varies substantially in inverse proportion to the progressive decrease of the diameter of the outer turn of the tape wound on the supply reel for maintaining a substantially constant back tension in the tape between capstan 20 and the supply reel. For example, the above described arrangement in accordance with this invention may be effective to provide a back tension on the tape which lies within the shaded area on FIG. 6. The presence of the back tension in such shaded area, rather than along a substantially straight horizontal line, results from other factors influencing the back tension, such as variations in the frictional braking force.

Of course, if desired, in a tape transport device according to this invention, the frictional brake for resisting turning of supply reel 13 in the normal-forward operating mode may be omitted, in which case the pulleys 131 and 138 and the wheel 130 of auxiliary transmission assembly 129 are dimensioned so that the constant rotational speed at which driving member 83 of fluid coupling 79 is driven is less than the rotational speed of supply reel 13 and driven member 84 when all of the tape is wound on the supply reel. In the latter case, irrespective of the amount of tape wound on supply reel 13, fluid coupling 79 provides a torque resisting turning of the supply reel, and such torque is progressively increased in accordance with the progressive decrease of the diameter of the outer turn of the tape wound on the supply reel for once again maintaining a substantially constant back tension in the tape.

The operation of the above described tape transport device 10 according to this invention may be summarized as follows:

Normal-forward Operating Mode

When push-button 28 is depressed or actuated to select the normal-forward operating mode, slide 32 is displaced to its operative position (FIG. 2) and the pinch roller (not shown) engages tape run 15 with rotated capstan 20 so that the latter drives the tape. After such displacement, slide 32 is locked in its operative position by the engagement of its projection 37 with the respective abutment 40 on locking member 38. The movement of slide 32 to its operative position moves pin 56 thereon away from spring lever 54 so that the latter can turn in the clockwise direction to permit spring 52 to move intermediate assembly 45 to its operative position. In the operative position of transmission assembly 45, wheels 46 and 47 thereof are respectively engaged with rotated flywheel 21 and driving member 99 of fluid coupling 95. With slide 32 in its operative position, which coincides with the inactive position of slide 33, torque change mechanism 111 establishes the relatively small gap or distance between driven member 102 of coupling 95 and the roof of cavity 100 in driving member 99 so that fluid coupling 95 applies a relatively high torque for securely rotating take-up real 14 at a relatively slow speed in the direction winding the tape thereon as the tape is driven toward reel 14 by capstan 20. Further, in the operative position of slide 32, pin 141 moves away from spring lever 139 to permit the engagement of wheel 130 of auxiliary transmission assembly 129 with driving member 83 of fluid coupling 79, whereby to maintain a substantially constant back tension in the tape between capstan 20 and supply reel 13 as the tape is being unwound from the latter. Thus, in the normal-forward operating mode, fluid couplings 79 and 95 included in the drive assemblies 16 and 17 for the supply and take-up reels ensure that the tape will be smoothly transported past the magnetic heads without the occurrence of flutter in the tape, and further with a substantially constant tension in the portion of the tape engaged by the magnetic heads for other recording or reproducing signals on the tape.

Fast-forward Operating Mode

When push-button 29 is depressed or actuated to select the fast-forward operating mode, slide 33 is displaced to its operative position where it is retained by the action of locking member 38 (FIG. 3), and pin 126 on slide 33 actuates torque change mechanism 111 so as to increase the gap or distance between driven member 102 and the roof of cavity 100 in driving member 99 of fluid coupling 95, as previously described. Further, the movement of slide 33 to its operative position moves spring member 65 away from shaft 59 of intermediate transmission assembly 57 so that spring 63 can cause the wheel 58 to simultaneously engage rotated flywheel 21 and the periphery of drum or driving member 99 of fluid coupling 95. Thus, take-up reel 14 is rotated at a relatively high speed in the direction to wind the tape thereon, with such high-speed rotation being effected by a relatively small transmitted torque so as to avoid damage to the tape, for example, as when the tape is completely unwound from supply reel 13.

Fast-Rewind Operating Mode

Figure 4:
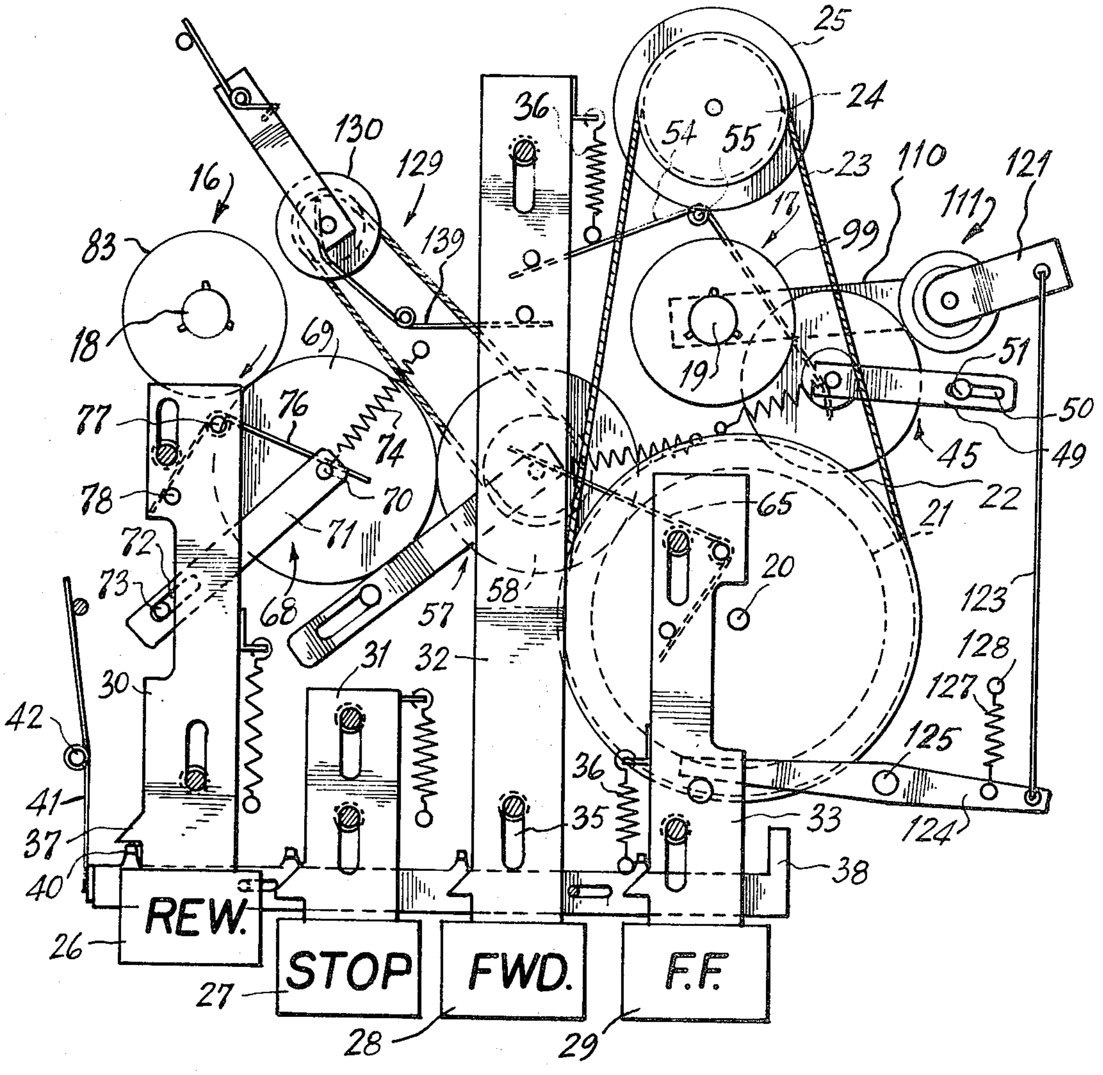
FIG. 4 is still another view similar to that of FIG. 1, but showing the tape transport device in its fast-rewind operating mode.

When push-button 26 is actuated or depressed to select the fast-rewind operating mode, slide 30 is moved to its operative position and retained therein by locking member 38 (FIG. 4). With slide 30 in its operative position, spring 76 is displaced away from shaft 70 to permit spring 74 to move intermediate transmission assembly 68 to its operative position in which wheel 69 simultaneously engages wheel 58 of intermediate transmission assembly 57 and drum or driving member 83 of fluid coupling 79. Since wheel 58 continues to engage rotated flywheel 21 with slide 33 in its inactive position, driving member 83 is rotated, by way of wheels 58 and 69, at a relatively high speed in the clockwise direction, that is, in the direction for rewinding the tape on supply reel 13.

It will be understood that when any one of the slides 30,32 and 33 is retained by locking member 38 in its operative position to select the fast-rewind, normal-forward or fast-forward operating mode of tape transport device, the movement of another one of the slides 30,32 and 33 to its operative position for selecting the respective operating mode automatically releases locking member 38 from the previously displaced slide so that the latter returns to its inactive position to discontinue the first selected operating mode. Further, any one of the normal-forward, fast-forward and fast-rewind operating modes of device 10 can be interrupted at will by actuating or depressing pushbutton 27 so as to move slide 31 to its operative position, whereby to release locking member 38 from the slide 30,32 or 33 previously held in its operative position by the engagement of the respective projection 37 and abutment 40. The released slide is actuated by its respective spring 36 to its inactive position, as shown in FIG. 1, with the result that the several component parts of tape transport device 10 return to the initial positions shown on FIG. 1.

Although illustrative embodiment of this invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a tape recording and/or reproducing apparatus, a tape transport device having at least a normal-forward operating mode in which a tape is withdrawn from a supply reel and wound on a take-up reel; said tape transport device comprising an electrically operating motor, tape drive means connected with said motor and operative in said normal-forward operating mode for driving the tape at a constant speed from said supply reel toward said take-up reel, reel drive means for applying torque to said take-up reel in the direction for winding the tape thereon and including fluid coupling means having a driven member adapted to be rotatably coupled to said take-up reel, a rotatable driving member and a body of liquid contacted by said driven and driving members for transmitting said torque therebetween, means for varying the distance between said driven and driving members in response to temperature change so as to compensate for changes in the viscosity of said liquid resulting from said temperature changes, and intermediate transmission means operative by said motor in said normal-forward operating mode for rotating said driving member so as to wind the tape on said take-up reel as the tape is driven at said constant speed by said tape drive means with a constant tension being maintained in the tape irrespective of said temperature changes.

2. In a tape recording and/or reproducing apparatus, a tape transport device having at least normal-and fast-forward operating modes in which a tape is withdrawn from a supply reel and wound on a take-up reel; said tape transport device comprising an electrically operated motor, tape drive means connected with said motor and operative in said normal-forward operating mode for driving the tape at a constant speed from said supply reel toward said take-up reel, reel drive means for applying torque to said take-up reel in the direction for winding the tape thereon and including fluid coupling means having a driven member adapted to be rotatably coupled to said take-up reel, a rotatable driving member and a body of liquid contacted by said driven and driving members for transmitting said torque therebetween, first intermediate transmission means operative by said motor in said normal-forward operating mode for rotating said driving member at a first speed so as to wind the tape on said take-up reel as the tape is driven at said constant speed by said tape drive means, second intermediate transmission means operative by said motor in said fast-forward operating mode for rotating said driving member at a second relatively high speed so as to rapidly wind the tape on said take-up reel, one of said driven and driving members of the fluid coupling means being movable toward and away from the other of said members for increasing and decreasing, respectively, the torque transmitted therebetween through said liquid, and torque change means for changing the distance between said driven and driving members so that said fluid coupling means can transmit a relatively large torque in said normal-forward operating mode and a relatively smaller torque in said fast-forward operating mode.

3. In a tape recording and/or reproducing apparatus, a tape transport device according to claim 2, further comprising means for varying the distance between said driven and driving members in response to temperature changes so as to compensate for changes in the viscosity of said liquid resulting from said temperature changes.

4. In a tape recording and/or reproducing apparatus, a tape transport device having at least normal-and fast-forward operating modes in which a tape is withdrawn from a supply reel and wound on a take-up reel; said tape transport device comprising an electrically operated motor, tape drive means connected with said motor and operative in said normal-forward operating mode for driving the tape at a constant speed from said supply reel toward said take-up reel, reel drive means for applying torque to said take-up reel in the direction for winding the tape thereon and including coupling means having a driven member adapted to be rotatably coupled to said take-up reel, a rotatable driving member and a body of liquid contacted by said driven and driving members for transmitting said torque therebetween, the torque transmitted from said driving member to said driven member being dependent on the distance therebetween and the viscosity of said liquid, first intermediate transmission means operative by said motor in said normal-forward operating mode for rotating said driving member at a first speed so as to wind the tape on said take-up reel as the tape is driven at said constant speed by said tape drive means, second intermediate transmission means operative by said motor in said fast-forward operating mode for rotating said driving member at a second relatively high speed so as to rapidly wind the tape on said take-up reel, and means for varying said distance between said driven and driving members in response to temperature changes so as to compensate for changes in said viscosity resulting from said temperature changes.

5. In a tape recording and/or reproducing apparatus, a tape transport device having at least normal-and fast-forward operating modes in which a tape is withdrawn from a supply reel and wound on a take-up reel; said tape transport device comprising an electrically operated motor, tape drive means connected with said motor and operative in said normal-forward operating mode for driving the tape at a constant speed from said supply reel toward said take-up reel, reel drive means for applying torque to said take-up reel in the direction for winding the tape thereon and including fluid coupling means having a driven member adapted to be rotatably coupled to said take-up reel, a rotatable driving member and a body of liquid contacted by said driven and driving members for transmitting said torque therebetween, first intermediate transmission means operative by said motor in said normal-forward operating mode for rotating said driving member at a first speed so as to wind the tape on said take-up reel as the tape is driven at said constant speed by said tape drive means, second intermediate transmission means operative by said motor in said fast-forward operating mode for rotating said driving member at a second relatively high speed so as to rapidly wind the tape on said take-up reel, reel drive means for said supply reel including second fluid coupling means having a driven member adapted to be rotatably coupled to said supply reel, a rotatable driving member and a body of liquid contacted by said driven member for transmitting a torque therebetween, and means operative by said motor in said normal-forward operating mode for rotating said driving member of the second fluid coupling means at a substantially constant rotational speed so that, as the tape is unwound from said supply reel by said tape drive means at said constant linear speed, the torque resisting turning of said supply reel with the respective driven member relative to said driving member of the second coupling means varies substantially in inverse proportion to the progressive decrease of the diameter of the outer turn of the tape wound on said supply reel for maintaining a substantially constant work tension in the tape between said tape drive means and said supply reel.

6. In a tape recording and/or reproducing apparatus, a tape transport device according to claim 5, further comprising third intermediate transmission means operative by said motor in a fast-rewind operating mode of said tape transport device for relatively rapidly rotating said driving member of the second fluid coupling means in the direction to rewind the tape on said supply reel.

7. In a tape recording and/or reproducing apparatus, a tape transport device according to claim 5, in which the torque transmitted between said driven and driving members of said second fluid coupling means is dependent on the distance therebetween and the viscosity of said liquid; and further comprising means for varying the distance between said driven and driving members of the second fluid coupling means in response to temperature changes so as to compensate for changes in said viscosity resulting from said temperature changes.

8. In a tape recording and/or reproducing apparatus, a tape transport device according to claim 7, in which one of said driven and driving members of the second fluid coupling means is movable relative to the other varying said distance therebetween, and said means for varying said distance includes a bimetallic member acting on said one member and flexing in response to said temperature changes for varying said distance.

9. In a tape recording and/or reproducing apparatus, a tape transport device according to claim 7; in which said means for varying said distance between said driven and driving members of said second fluid coupling means is constituted by at least a bimetallic portion of one of said members which flexes in response to said temperature changes.

10. In a tape recording and/or reproducing apparatus, a tape transport device having at least a normal forward operating mode in which a tape is unwound from a supply reel and wound on a take-up reel; said tape transport device comprising an electrically operated motor, tape drive means connected with said motor and operative in said normal-forward operating mode for driving the tape at a constant linear speed from said supply reel toward said take-up reel, reel drive means for said supply reel including fluid coupling means having a driven member adapted to be rotatably coupled to said supply reel, a rotatable driving member and a body of liquid contacted by said driving and driven members for transmitting torque therebetween, means operative by said motor in said normal-forward operating mode for rotating said driving member of a substantially constant rotational speed so that, as the tape is unwound from said supply reel by said tape drive means at said constant linear speed, the torque resisting turning of said driven member with said supply reel relative to said driving member varies substantially in inverse proportion to the progressive decrease of the diameter of the outer turn of the tape wound on said supply reel for maintaining a substantially constant back tension in the tape between said tape drive means and said supply reel, reel drive means for said take-up reel including second fluid coupling means having a driven member adapted to be rotatably coupled to said take-up reel, a rotatable driving member and a body of liquid contacted by said driving and driven members of the second fluid coupling means, means operative by said motor in said normal-forward operating mode for rotating said driving member of the second fluid coupling means in the direction for winding the tape on said take-up reel, said driven and driving members of at least one of the first mentioned and second fluid coupling means being movable relative to each other for varying the distance therebetween and thereby varying the torque transmitted through said liquid of the respective fluid coupling means, and means for varying said distance between said relatively movable driven and driving members in response to temperature changes so as to compensate for changes in the viscosity of the liquid therebetween resulting from said temperature changes.

* * * * *

UNITED STATES PATENT OFFICE

CERTIFICATE OF CORRECTION

Patent No. 3,912,195 Dated October 14, 1975

Inventor(s) Hideharu Yamamoto Page 1 of 2

It is certified that error appears in the above-identified patent and that said Letters Patent are hereby corrected as shown below:

In the specification

Column 1, line 36, change "of" to --on--,

Column 2, line 19, after "the" insert --back---

Column 4, line 16, change "take" second occurrance to --tape--,

Column 6, line 40, change "displaying" to --displacing--,

Column 7, line 21, change "slide" to --side--,

Column 7, line 44, change "temperature" to --temperatures--,

Column 7, line 52, change "84" to --94--,

Column 8, line 7, change "temperature" to --temperatures--,

Column 8, line 55, change "as" to --are--,

Column 10, line 16, change "of" to --or--,

Column 10, line 24, change "of" to --or--,

Column 11, line 48, change "red" to --reel--,

Column 12, line 27, after "intermediate" insert --transmission--;

UNITED STATES PATENT OFFICE
CERTIFICATE OF CORRECTION

Patent No. 3,912,195 Dated October 14, 1975

Inventor(s) Hideharu Yamamoto

It is certified that error appears in the above-identified patent and that said Letters Patent are hereby corrected as shown below:

Column 12, line 53, change "other" to --either--,

Column 13, line 43, change "actuated" to --returned--,

Column 13, line 44, change "in" to --on--,

Column 13, line 48, change "embodiment" to --embodiments--,

In the claims

Column 13, line 61, change "operat" to --operated--,

Column 13, line 62, delete --ing--,

Column 14, line 7, change "change" to --changes--,

Column 14, line 67, after "coupling" insert --fluid--,

Column 15, line 58, before "coupling" insert --fluid--,

Column 16, line 18, after "other" insert --for--,

Column 16, line 43, after "transmitting" insert --a--,

Column 16, line 45, change "of" to --at--.

Signed and Sealed this

Eleventh Day of January 1977

[SEAL]

*Attest:*

RUTH C. MASON
*Attesting Officer*

C. MARSHALL DANN
*Commissioner of Patents and Trademarks*